United States Patent
Han et al.

(10) Patent No.: US 12,452,331 B1
(45) Date of Patent: Oct. 21, 2025

(54) FILE-SHARING METHOD, APPARATUS AND SYSTEM, ELECTRONIC DEVICE, AND STORAGE MEDIUM

(71) Applicant: Suzhou MetaBrain Intelligent Technology Co., Ltd., Jiangsu (CN)

(72) Inventors: Lei Han, Jiangsu (CN); Yan Qu, Jiangsu (CN)

(73) Assignee: Suzhou MetaBrain Intelligent Technology Co., Ltd., Jiangsu (CN)

(*) Notice: Subject to any disclaimer, the term of this patent is extended or adjusted under 35 U.S.C. 154(b) by 0 days.

(21) Appl. No.: 19/115,850

(22) PCT Filed: Sep. 29, 2024

(86) PCT No.: PCT/CN2024/122204
§ 371 (c)(1),
(2) Date: Mar. 27, 2025

(87) PCT Pub. No.: WO2025/082187
PCT Pub. Date: Apr. 24, 2025

(30) Foreign Application Priority Data

Oct. 18, 2023 (CN) .......................... 202311346113.2

(51) Int. Cl.
*H04L 67/06* (2022.01)
*G06F 16/172* (2019.01)
*G06F 16/176* (2019.01)

(52) U.S. Cl.
CPC ............ *H04L 67/06* (2013.01); *G06F 16/172* (2019.01); *G06F 16/176* (2019.01)

(58) Field of Classification Search
CPC ....... H04L 67/06; G06F 16/172; G06F 16/176
See application file for complete search history.

(56) References Cited

U.S. PATENT DOCUMENTS

| 2005/0251500 A1 | 11/2005 | Vahalia et al. |
| 2014/0195669 A1 | 7/2014 | Bhatia et al. |

(Continued)

FOREIGN PATENT DOCUMENTS

| CN | 101026460 A | 8/2007 |
| CN | 102722458 A | 10/2012 |

(Continued)

OTHER PUBLICATIONS

International Search Report of corresponding PCT application (PCT/CN2024/122204), mailed Jan. 1, 2025, 8 pages.

(Continued)

*Primary Examiner* — El Hadji M Sall
(74) *Attorney, Agent, or Firm* — Cooper Legal Group, LLC

(57) ABSTRACT

A file-sharing method, apparatus and system, an electronic device, and a storage medium. The method includes: receiving file access requests a plurality of slave BMCs, determining, based on a file system mapping table in the master BMC, a file to be acquired corresponding to the file access request and a target slave BMC storing the file to be acquired; and acquiring, based on the file transmission path, the file to be acquired from the target slave BMC and transmits to a slave BMC that sends a file access request. By configuring a file system mapping table in the master BMC, after receiving a file access request, the master BMC queries the file system mapping table to acquire the file to be acquired, thereby enabling file sharing among the BMCs of various server nodes and enhancing the file transmission efficiency of various server nodes in the server system.

20 Claims, 6 Drawing Sheets

(56) References Cited

U.S. PATENT DOCUMENTS

| | | | |
|---|---|---|---|
| 2014/0280756 A1* | 9/2014 | Maity | H04L 67/131 |
| | | | 709/219 |
| 2018/0157494 A1 | 6/2018 | Dunham et al. | |
| 2019/0208021 A1* | 7/2019 | Yang | H04L 67/60 |
| 2021/0337011 A1* | 10/2021 | Wang | H04L 67/1095 |
| 2021/0382623 A1* | 12/2021 | Wang | G06F 11/3409 |
| 2022/0027350 A1* | 1/2022 | Chaudhry | G06F 16/1824 |
| 2022/0294865 A1* | 9/2022 | Guyan | G06T 11/001 |

FOREIGN PATENT DOCUMENTS

| | | |
|---|---|---|
| CN | 106385426 A | 2/2017 |
| CN | 109032979 A | 12/2018 |
| CN | 114116631 A | 3/2022 |
| CN | 114584454 A | 6/2022 |
| CN | 115604250 A | 1/2023 |
| CN | 116827601 A | 9/2023 |
| CN | 117076409 A | 11/2023 |

OTHER PUBLICATIONS

Written Opinion of International Searching Authority of corresponding PCT application (PCT/CN2024/122204), mailed Jan. 1, 2025, 9 pages.
First Office Action of corresponding CN priority application (CN202311346113.2), mailed Nov. 22, 2023, 9 pages.
Notification to Grant Patent Right for Invention of corresponding CN priority application (CN202311346113.2), mailed Dec. 8, 2023, 2 pages.
Search Report dated Jul. 1, 2025 for European patent application No. 24875671.0, 11 pages.

\* cited by examiner

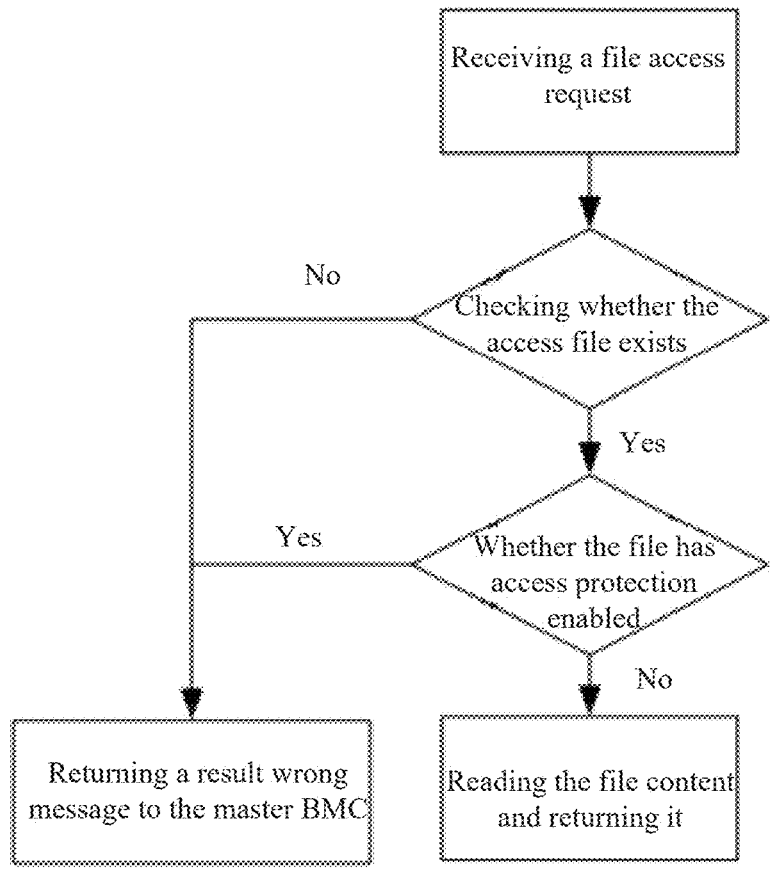

FIG. 3

Sending the file access request to the master BMC, such that after receiving the file access request, the master BMC determines, based on a file system mapping table in the master BMC, a file to be acquired corresponding to the file access request and a target slave BMC storing the file to be acquired among the slave BMCs, determines, based on a connection relationship table in the master BMC, a file transmission path for obtaining the file to be acquired from the target slave BMC, and acquires, based on the file transmission path, the file to be acquired from the target slave BMC and transmits the file to be acquired to the slave BMC that sends the file access request ⟋410

Receiving the file to be acquired that is sent by the master BMC ⟋420

FIG. 4

910 Request sending module

920 File reception module

FILE-SHARING METHOD, APPARATUS AND SYSTEM, ELECTRONIC DEVICE, AND STORAGE MEDIUM

CROSS-REFERENCE TO RELATED APPLICATION

This application claims priority of Chinese Patent Application No. 202311346113.2, entitled "FILE-SHARING METHOD, APPARATUS AND SYSTEM, ELECTRONIC DEVICE, AND STORAGE MEDIUM", filed to the China National Intellectual Property Administration on Oct. 18, 2023, the entire contents of which are hereby incorporated by reference.

FIELD

The present application relates to the field of server technology, and more particularly, to a file-sharing method, apparatus and system, an electronic device, and a storage medium.

BACKGROUND

A server system generally includes a plurality of server nodes. File resource scheduling among the server nodes involves managing and scheduling transmitting and access of file resources, such as upgrade files and configuration files, among different server nodes. The file resource scheduling among the server nodes involves determining which server node stores file resources, how to transmit files from one node to another, and ensuring that access and utilization of the file resources meet performance and reliability requirements.

In the existing server system, the file resource scheduling among the server nodes requires logging into the server nodes to realize the file resource scheduling among different server nodes.

SUMMARY

The present application provides a file-sharing method, apparatus and system, an electronic device, and a storage medium.

In a first aspect, the present application provides a file-sharing method applied to a master baseboard management controller BMC, where a master BMC and a plurality of slave BMCs are BMCs of different server nodes in a server system, the method includes:
  receiving file access requests from the plurality of slave BMCs;
  determining, based on a file system mapping table in the master BMC, a file to be acquired corresponding to the file access requests and a target slave BMC storing the file to be acquired among the plurality of slave BMCs, where the file system mapping table includes file storage addresses of the plurality of slave BMCs and file information stored in the file storage addresses;
  determining, based on a connection relationship table in the master BMC, a file transmission path for obtaining the file to be acquired from the target slave BMC, where the connection relationship table is determined based on the connection relationships of various server nodes in the server system; and
  acquiring, based on the file transmission path, the file to be acquired from the target slave BMC and transmitting the file to be acquired to a slave BMC that sends a file access request.

According to the file-sharing method provided in the present application, acquiring, based on the file transmission path, the file to be acquired from the target slave BMC includes:
  generating, based on the file information of the file to be acquired and the file transmission path, a file extraction message for the file to be acquired; and
  sending the file extraction message to the target slave BMC, such that the target slave BMC transmits the file to be acquired to the master BMC based on the file transmission path.

According to the file-sharing method provided in the present application, transmitting the file to be acquired to the slave BMC that sends the file access request includes:
  encrypting the file to be acquired to obtain an encrypted file to be acquired, compressing the encrypted file to be acquired to obtain a compressed file; and
  transmitting the compressed file to the slave BMC that sends the file access request.

According to the file-sharing method provided in the present application, after acquiring the file to be acquired from the target slave BMC, the method further includes: storing the file to be acquired into a cache space of the master BMC.

According to the file-sharing method provided in the present application, after storing the file to be acquired into a cache space of the master BMC, the method further includes:
  in response to determining that the received file access requests from the plurality of slave BMCs are for acquiring the file to be acquired, acquiring the file to be acquired from the cache space, and transmitting the file to be acquired to the slave BMC that sends the file access request.

According to the file-sharing method provided in the present application, the method further includes:
  determining a required file to be acquired by the master BMC;
  determining, based on the file system mapping table, a corresponding slave BMC among the plurality of slave BMCs that stores the required file; and
  acquiring the required file from the corresponding slave BMC that stores the required file.

According to the file-sharing method provided in the present application, after receiving file access requests from the plurality of slave BMCs, the method further includes:
  determining an execution priority of the file access requests from the plurality of slave BMCs; and
  adding, based on the execution priority, the file access requests from the plurality of slave BMCs to a request queue, such that the master BMC executes a file acquisition operation based on the request queue.

According to the file-sharing method provided in the present application, determining the execution priority of file access requests from a plurality of slave BMCs includes:
  receiving real-time load information of the plurality of slave BMCs; and
  determining, based on the real-time load information of the plurality of slave BMCs, a load order of the plurality of slave BMCs and determining, based on the load order, the execution priority of the file access requests from the plurality of slave BMCs.

According to the file-sharing method provided in the present application, the method further includes:
  receiving a file modification request;
  determining, based on the file system mapping table in the master BMC, the file to be modified corresponding to the file modification request and the slave BMC storing the file to be modified among the plurality of slave BMCs; and sending the file modification request to the slave BMC storing the file to be modified, thereby enabling the slave BMC storing the file to be modified to modify the file to be modified.

In a second aspect, the present application further provides a file-sharing method applied to a slave BMC, where the master BMC and a plurality of slave BMCs are BMCs of different server nodes in a server system, the method includes:

sending a file access request to the master BMC, such that after receiving the file access request, the master BMC determines, based on a file system mapping table in the master BMC, a file to be acquired corresponding to the file access request and a target slave BMC storing the file to be acquired among the plurality of slave BMCs, determines, based on a connection relationship table in the master BMC, a file transmission path for obtaining the file to be acquired from the target slave BMC, and acquires, based on the file transmission path, the file to be acquired from the target slave BMC and transmits the file to be acquired to the slave BMC that sends the file access request, where the file system mapping table includes file storage addresses of the plurality of slave BMCs and file information stored in the file storage addresses, the connection relationship table is determined based on the connection relationships of various server nodes in the server system; and receiving the file to be acquired that is sent by the master BMC.

According to the file-sharing method provided in the present application, the method further includes:

sending a file modification request to the master BMC, such that the master BMC determines, based on a file system mapping table in the master BMC, a file to be modified corresponding to the file modification request and the slave BMC storing the file to be modified among the plurality of slave BMCs, and sends the file modification request to the slave BMC storing the file to be modified, thereby enabling the slave BMC storing the file to be modified to modify the file to be modified.

According to the file-sharing method provided in the present application, the method further includes:

receiving a file extraction message from a master BMC, and acquiring, based on the file extraction message, a file to be acquired corresponding to the file extraction message from a storage space; and sending the file to be acquired to the master BMC.

According to the file-sharing method provided in the present application, receiving a file to be acquired sent by a master BMC, includes:

receiving a compressed file sent by the master BMC, where the compressed file is generated, by the master BMC, through encrypting the file to be acquired to obtain an encrypted file to be acquired, and subsequently compressing the encrypted file to be acquired;

decompressing the compressed file to obtain the encrypted file to be acquired; and decrypting the encrypted file to be acquired to obtain the file to be acquired.

In a third aspect, the present application further provides a file-sharing apparatus applied to a master baseboard management controller BMC, where the master BMC and a plurality of slave BMCs are BMCs of different server nodes in a server system, the apparatus includes:

a request reception module, configured to receive file access requests from the plurality of slave BMCs;

a file query module, configured to determine, based on a file system mapping table in the master BMC, a file to be acquired corresponding to the file access request and a target slave BMC storing the file to be acquired among the plurality of slave BMCs, where the file system mapping table includes file storage addresses of the plurality of slave BMCs and file information stored in the file storage addresses;

a file path determination module, configured to determine, based on a connection relationship table in the master BMC, a file transmission path for obtaining the file to be acquired from the target slave BMC, where the connection relationship table is determined based on the connection relationships of various server nodes in the server system; and a file acquisition module, configured to acquire, based on the file transmission path, the file to be acquired from the target slave BMC and transmit the file to be acquired to a slave BMC that sends a file access request.

In a fourth aspect, the present application further provides a file-sharing apparatus applied to a slave baseboard management controller BMC, where a master BMC and a plurality of slave BMCs are BMCs of different server nodes in a server system, the apparatus includes:

a request sending module, configured to send a file access request to the master BMC, such that after receiving the file access request, the master BMC determines, based on a file system mapping table in the master BMC, a file to be acquired corresponding to the file access request and a target slave BMC storing the file to be acquired among the plurality of slave BMCs, determines, based on a connection relationship table in the master BMC, a file transmission path for obtaining the file to be acquired from the target slave BMC, and acquires, based on the file transmission path, the file to be acquired from the target slave BMC and transmits the file to be acquired to the slave BMC that sends the file access request, where the file system mapping table comprises file storage addresses of the plurality of slave BMCs and file information stored in the file storage addresses, the connection relationship table is determined based on the connection relationships of various server nodes in the server system; and a file reception module, configured to receive the file to be acquired that is sent by the master BMC.

In a fifth aspect, the present application further provides a file-sharing system, including a master baseboard management controller BMC and a plurality of slave BMCs, where the master BMC and the plurality of slave BMCs are BMCs of different server nodes in a server system;

the master BMC receives file access requests from the plurality of slave BMCs;

the master BMC determines, based on a file system mapping table in the master BMC, a file to be acquired corresponding to the file access request and a target slave BMC storing the file to be acquired among the plurality of slave BMCs, where the file system mapping table includes file storage addresses of the plurality of slave BMCs and file information stored in the file storage addresses;

the master BMC determines, based on a connection relationship table in the master BMC, a file transmission path for acquiring a file to be acquired from a target slave BMC, and the connection relationship table is determined based on a connection relationship of various server nodes in the server system;

the master BMC acquires, based on the file transmission path, the file to be acquired from the target slave BMC and transmits the file to be acquired to the slave BMC that sends the file access request; and the slave BMC sending the file access request receives the file to be acquired that is sent by the master BMC.

In a sixth aspect, the present application further provides an electronic device, including:

one or more processors; and a memory, associated with one or more processors, the memory configured to store computer-readable instructions, where the computer-readable instructions, when read and executed by one or more processors, implement the file-sharing method described above.

In a seventh aspect, the present application further provides a non-transitory computer-readable storage medium, the non-transitory computer-readable storage medium stores computer-readable instructions, which, when executed by one or more processors, implement the file-sharing method described above.

BRIEF DESCRIPTION OF THE DRAWINGS

In order to more clearly illustrate the technical solutions of the present application or the related art, the accompanying drawings required for describing the embodiments or the related art will be briefly introduced below. It is evident that the accompanying drawings in the following description are some embodiments of the present application. For those of ordinary skill in the art, other drawings may be derived from these accompanying drawings without the need for inventive effort.

FIG. 3 is a flow diagram of the file-sharing process of a slave BMC provided in the present application;

FIG. 4 is a second flow diagram of the file-sharing method provided in some embodiments of the present application;

DETAILED DESCRIPTION

In order to make the objectives, technical solutions, and advantages of the present application clearer, the technical solutions of the present application will be described in detail and completely below with reference to the accompanying drawings. It is evident that the described embodiments are only a part of the embodiments of the present application, rather than all of them. Based on the embodiments of the present application, all other embodiments obtained by a person of ordinary skill in the art without making any creative effort shall fall within the scope of protection of the present application.

Figure 1:
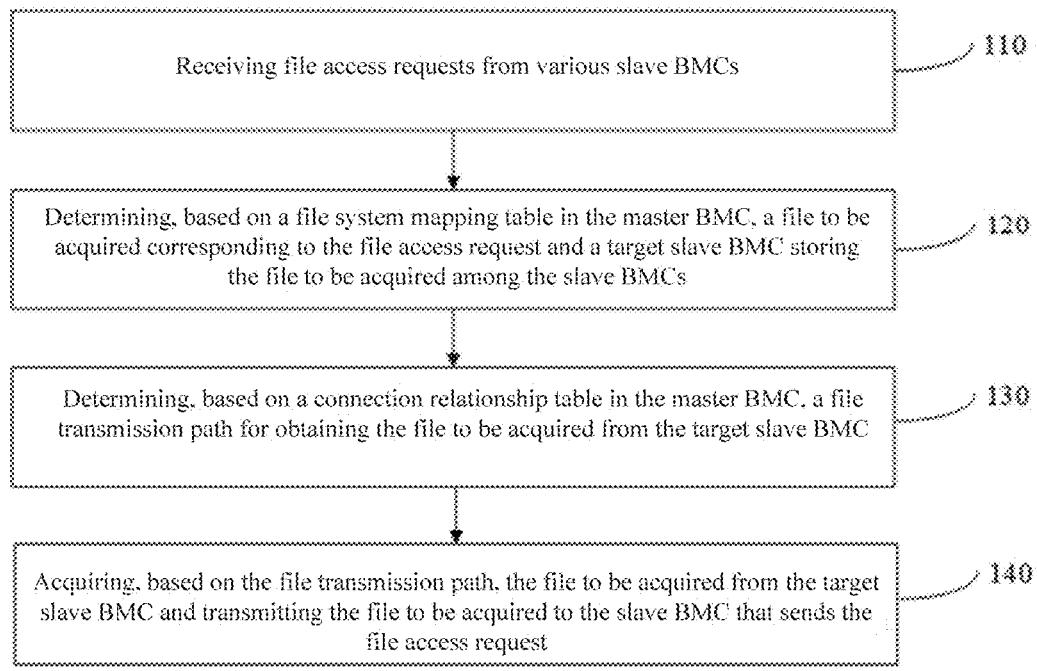
FIG. 1 is a first flow diagram of a file-sharing method provided in some embodiments of the present application.

The present application provides a file-sharing method. FIG. 1 is a first flow diagram of the file-sharing method according to some embodiments of the present application. Referring to FIG. 1, the file-sharing method according to the embodiments of the present application is applied to a master baseboard management controller (BMC), where the master BMC and a plurality of slave BMCs are BMCs of different server nodes in a server system. The method includes following steps:

Step 110, receiving file access requests from the plurality of slave BMCs;

Step 120, determining, based on a file system mapping table in the master BMC, a file to be acquired corresponding to the file access requests and a target slave BMC storing the file to be acquired among the plurality of slave BMCs, where the file system mapping table includes file storage addresses of the plurality of slave BMCs and file information stored in the file storage addresses;

Step 130, determining, based on a connection relationship table in the master BMC, a file transmission path for obtaining the file to be acquired from the target slave BMC, where the connection relationship table is determined based on the connection relationships of various server nodes in the server system;

Step 140, acquiring, based on the file transmission path, the file to be acquired from the target slave BMC and transmitting the file to be acquired to the slave BMC that sends the file access request.

The server system in the embodiments of the present application is constituted by a plurality of server nodes. Each server node includes a BMC. The BMC is a hardware component integrated into a server motherboard, which is utilized for monitoring, managing, and controlling system hardware and associated functions. The BMC generally includes a dedicated microprocessor, a memory, and interface circuits, which are independent of a main processor. The BMC facilitates remote management, hardware monitoring, hardware upgrading, remote control, logging, and Basic Input/Output System (BIOS) management of server hardware via remote management tools, thereby simplifying and optimizing the system management and maintenance processes.

The BMCs corresponding to a plurality of server nodes in a server system are classified into a master BMC and a plurality of slave BMCs. The master BMC is configured to coordinate and manage the file access operations of all slave BMCs. A controller may be configured within the master BMC. Based on the controller, file resources may be dynamically allocated and scheduled according to the system state and requirements, thereby ensuring efficient and stable access. In the selection of the master BMC, the BMC corresponding to the server node with a high functional core degree in the server system may be considered.

The slave BMC, in contrast to the master BMC, is a BMC that is managed and scheduled by the master BMC. The subordinate node executes the file scheduling tasks assigned by the master BMC.

In the following, the technical solution of the present application will be described in detail by taking the master BMC executing the file-sharing method provided in the present application as an example.

In step 110, the master BMC receives file access requests from a plurality of slave BMCs.

A file access request is a request sent by a slave BMC to acquire a file. When a slave BMC needs to acquire a file, a file access request is sent to the master BMC. After the master BMC receives the file access request sent by the slave BMC, the master BMC executes the corresponding request response.

In server systems, BMC is typically used to monitor and manage server hardware, such as CPU (Central Processing Unit), memory, hard disk, etc. The BMC is also responsible for monitoring the power status of the server and controlling the remote power on/off of the server. With the expansion of server scale, the functionality of the BMC becomes increasingly diversified. The BMC not only monitors the hardware status but also provides additional services, such as remote control, hardware upgrades, and virtualization. Among these services, file access constitutes one of the most fundamental services.

The BMC in the server system of the related method is typically a standalone chip, and communication among BMCs is generally implemented via an Inter-Integrated Circuit (I2C) bus or a full-duplex, synchronous serial peripheral interface (SPI) bus. This communication method has certain limitations, such as slow communication speed and limited transmission distance. In some large-scale data centers, to enhance the reliability and flexibility of the system, it is necessary to employ a plurality of BMCs, thereby necessitating file system sharing among the BMCs.

Due to the communication constraints based on the I2C bus or SPI bus in the related art, in order to enhance the communication speed and transmission distance, a communication link among a plurality of BMCs may be established prior to the interaction between a master BMC and a plurality of slave BMCs. A transmission control protocol/internet protocol (TCP/IP) protocol stack may be configured on the BMCs, and a communication connection among the BMCs is established via the network protocol, thereby enabling message and data transmission between the master BMC and a plurality of slave BMCs.

In some embodiments, the connection relationship established between the master BMC and the plurality of slave BMCs may be a star connection relationship where each of the plurality of slave BMCs is individually connected to the master BMC. Based on this connection relationship, during data sharing, since each slave BMC is directly connected to the master BMC, direct communication between a plurality of slave BMCs and the master BMC may be realized, thereby enhancing the efficiency of data sharing.

In step 120, based on a file system mapping table configured in a master BMC, a file to be acquired corresponding to a file access request and a target slave BMC storing the file to be acquired among a plurality of slave BMCs are determined.

The file system mapping table is pre-built, and the file system mapping table includes file storage addresses of a plurality of slave BMCs and file information stored in the file storage addresses. After the master BMC receives a file access request, the master BMC performs a query in a file system mapping table to determine the file to be acquired as specified in the file access request and the target slave BMC that contains the file to be acquired.

It is to be understood that each slave BMC includes a storage space. The file resources may be stored in the storage space of each slave BMC. The file system mapping table records the file resources stored in the storage space of each slave BMC. File resources in each slave BMC may be scheduled by the master BMC based on the file system mapping table, thereby enabling file exchange among a plurality of slave BMCs.

In step 130, a file transmission path for obtaining a file to be acquired from a target slave BMC is determined based on a connection relationship table in the master BMC, where the connection relationship table is determined based on the connection relationships of various server nodes in the server system.

It is to be understood that various server nodes in the server system are interconnected, thereby establishing a connection relationship. Based on the connection relationship, a connection relationship table of various server nodes may be determined. The connection relationship may be a serial connection relationship among various server nodes, or a star connection relationship where each slave BMC is respectively connected to a master BMC and the like.

After the master BMC determines the target slave BMC corresponding to the file to be acquired, there may be a plurality of communication paths between the master BMC and the target slave BMC, with a plurality of slave BMCs interspersed in between. Based on the connection relationship table, the optimal path between the master BMC and the target slave BMC may be determined. By acquiring the file to be acquired from the target slave BMC via the optimal path, the efficiency of file acquisition may be enhanced.

At the same time, based on the file transmission path, the acquisition path for acquiring the file to be acquired from the target slave BMC may be determined, thereby enabling the extraction of the file to be acquired.

In step 140, based on the file transmission path, the master BMC acquires the file to be acquired from the target slave BMC and sends the file to be acquired to the slave BMC that sent the file access request.

It is to be understood that, based on a master BMC, receiving file access requests from the plurality of slave BMCs, acquiring a file to be acquired from the plurality of slave BMCs, and sending the file to be acquired to the slave BMC requiring access thereto, thereby realizing file sharing among the plurality of BMCs in a server system, enabling mutual file transmission among the BMCs of various server nodes, and enhancing the file transmission efficiency of various server nodes in the server system.

For example, when the hard disk firmware of various server nodes in the server system requires an upgrade, the BMC of the server node controls the corresponding hard disk firmware to execute the upgrade operation. Based on the file-sharing method among the BMCs of each server, after receiving the firmware upgrade file in a certain BMC, the firmware upgrade file may be transmitted among the BMCs of various server nodes through the master BMC of the server system, thereby realizing the sharing of the firmware upgrade file in the BMCs of various server nodes, realizing efficient transmission of the firmware upgrade file, and enhancing the efficiency of the firmware upgrade.

In some embodiments, file resource sharing among the BMCs of respective server nodes in the server system may be implemented by running a file system agent program in the BMCs of various server nodes to process file access requests and responses, thereby enabling file sharing among the BMCs of the server nodes.

The file-sharing method provided in the embodiments of the present application configures, within a master BMC, a file system mapping table that includes file storage addresses of a plurality of slave BMCs and file information stored in the file storage addresses, thereby enabling the master BMC to query the file system mapping table and acquire the file to be acquired corresponding to the file access request and its storage location after receiving the file access request. Based on a storage location, acquiring a file to be acquired and transmitting the file to be acquired to a corresponding slave BMC, thereby enabling mutual file transmission within the BMCs of various server nodes, facilitating file sharing among the BMCs of the server nodes, and enhancing the file transmission efficiency of various server nodes in a server system.

In some embodiments, acquiring, based on the file transmission path, the file to be acquired from the target slave BMC includes: generating, based on the file information of the file to be acquired and the file transmission path, a file extraction message for the file to be acquired; sending the file extraction message to the target slave BMC, such that the target slave BMC transmits the file to be acquired to the master BMC based on the file transmission path.

When obtaining a file to be acquired from a target slave BMC, a file extraction message for the file to be acquired is generated and sent to the target slave BMC. The file extraction message includes file information of the file to be acquired and a file transmission path.

After receiving a file extraction message, the target slave BMC acquires the file to be acquired from the storage space based on the file transmission path and transmits the acquired file to the master BMC.

Figure 2:
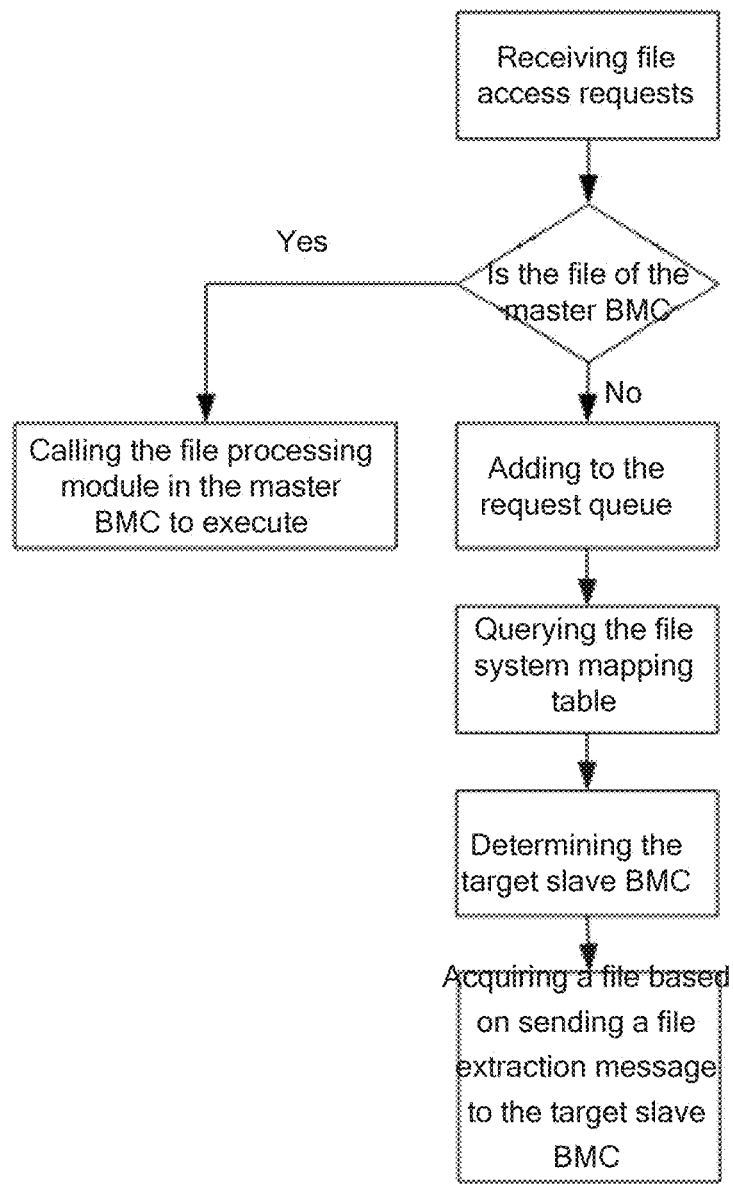
FIG. 2 is a flow diagram of the file-sharing process executed by a master BMC file provided in the present application.

In some embodiments, the master BMC executing file-sharing process may be shown as the master BMC file executing file-sharing process provided in this application in FIG. 2. After receiving a file access request, the master BMC determines whether the request is to access a file within the storage space of the master BMC. In response to determining that a file within the storage space of the master BMC is being accessed, the file processing module in the master BMC is called for execution. In response to determining that a file being accessed is in the slave BMC, the file access request is added to the request queue, and the file system mapping table is queried to determine the target slave BMC storing the file to be processed corresponding to the file access request. The target slave BMC transmits a file extraction message to make the target slave BMC to send the file to be acquired to the master BMC.

The file-sharing process executed by the slave BMC may be illustrated in FIG. 3, which is a schematic diagram of the file-sharing process of the slave BMC provided in the present application. After receiving a file access request, the slave BMC first checks whether the access file exists. In response to a determination that the access file is exist, it proceeds to check whether the file has access protection enabled. In response to a determination that the file does not have the access protection enabled, the slave BMC acquires the file to be acquired from the storage space and returns the file to be acquired to the master BMC. In response to a determination that the file has the access protection enabled, the slave BMC returns an error message to the master BMC.

The file-sharing method provided in the embodiments of the present application realizes the acquisition of a file to be acquired by generating a file extraction message for the file to be acquired and transmitting the file extraction message to a target slave BMC.

In some embodiments, transmitting the file to be acquired to the slave BMC that sends the file access request includes: encrypting the file to be acquired to obtain an encrypted file to be acquired, and compressing the encrypted file to be acquired to obtain a compressed file; transmitting the compressed file to the slave BMC that sends the file access request.

After the master BMC receives the file to be acquired, the file to be acquired is encrypted and compressed to obtain a compressed file and the compressed file is transmitted to the slave BMC that sends the file access request. After receiving the compressed file, the slave BMC that sends the file access request performs decompression and decryption to obtain the file to be acquired. Based on compressed transmission, the transmission speed of the file to be acquired may be enhanced, thereby improving the transmission efficiency.

In some embodiments, the encryption process may be performed by selecting a symmetric encryption algorithm, such as Advanced Encryption Standard (AES) or Data Encryption Standard (DES), or an asymmetric encryption algorithm, such as Rivest-Shamir-Adleman (RSA) or Elliptic Curve Cryptography (ESS), based on the data encryption algorithm, thereby enhancing the security and efficiency of file transmission.

The embodiments of the present application provide a file-sharing method, which enhances the security and efficiency of file transmission by encrypting and compressing a file to be transmitted during the transmission of a file to be acquired.

In some embodiments, after acquiring the file to be acquired from the target slave BMC, the method further includes: storing the file to be acquired into a cache space of the master BMC.

A cache space is established in the master BMC, and the configured cache space is utilized for storing the most recently accessed file data. After the master BMC obtains the file to be acquired, the file to be acquired is stored in the cache space of the master BMC.

It is to be understood that during the firmware upgrade process of various server nodes in a server system, after a BMC obtains an upgraded firmware file, the upgraded firmware is stored in a cache space. Subsequently, when other BMCs perform firmware upgrades, the upgraded firmware may be directly acquired from the cache space of the master BMC, thereby reducing redundant file request operations and enhancing the efficiency of file acquisition.

The file-sharing method provided in the embodiments of the present application facilitates subsequent acquisition of a file to be acquired by other BMCs by storing the file to be acquired into a cache space of the master BMC after the master BMC obtains the file to be acquired.

In some embodiments, after storing the file to be acquired into a cache space of the master BMC, the method further includes: in response to determining that the received file access requests from the plurality of slave BMCs are for acquiring the file to be acquired, acquiring the file to be acquired from the cache space, and transmitting the file to be acquired to the slave BMC that sends the file access request.

The file to be acquired is stored in the cache space of the master BMC and may be directly acquired from the cache space when a plurality of subsequent slave BMCs require access to the file to be acquired.

The master BMC receives file access requests from a plurality of slave BMCs. In response to a determination that the file access request is for obtaining a file to be acquired, the master BMC acquires the file to be acquired from a cache space and transmits it to the slave BMC that sent the file access request.

It is to be understood that the files stored in the cache space may be updated as required, and the most recently accessed file data may also be stored, thereby reducing redundant file request operations to enhance the speed of file access.

The file-sharing method provided by the embodiments of the present application stores a file to be acquired in a cache space of a master BMC, and when a plurality of subsequent slave BMCs need to obtain the file to be acquired, the file may be directly obtained from the cache space, thereby reducing request operations for the same file and improving file access efficiency.

In some embodiments, the system further includes: determining a required file to be acquired by the master BMC; determining, based on the file system mapping table, a corresponding slave BMC among the plurality of slave BMCs that stores the required file; acquiring the required file from the corresponding slave BMC that stores the required file.

The master BMC, as one of the BMCs in the server system, also needs to acquire the file resources. In the event that it is determined that the master BMC is required to obtain a file, the required file to be acquired by the master BMC is determined.

The master BMC determines the slave BMC of the storage required file based on the form of querying the file system mapping table and directly acquires the required file from the slave BMC of the storage required file.

The file-sharing method provided in the embodiments of the present application, by directly querying a file system mapping table and directly obtaining a required file from a slave BMC storing the required file when the master BMC needs to acquire the required file, realizes the process of acquiring the required file by the master BMC.

In some embodiments, after receiving file access requests from the plurality of slave BMCs, the method further includes: determining an execution priority of the file access requests from the plurality of slave BMCs; adding, based on the execution priority, the file access requests from the plurality of slave BMCs to a request queue, such that the master BMC executes a file acquisition operation based on the request queue.

A plurality of slave BMCs may send a plurality of file access requests to a master BMC. After simultaneously receiving the plurality of file access requests, the master BMC processes each file access request based on the execution priority of each respective file access request.

Determine execution priorities of file access requests from a plurality of slave BMCs, and add each file access request to a request queue based on the order in the execution priorities. The request queue stores the requests in a sequential manner to ensure the orderliness and fairness of the requests.

After constructing the request queue, the master BMC processes each file access request based on the priority sequence of the file access requests in the request queue.

The file-sharing method provided by the embodiments of the present application ensures the order and fairness of file access requests by constructing a request queue in a master BMC based on the execution priorities of file access requests from a plurality of slave BMCs and processing the file access requests according to the priority order of the file access requests in the request queue.

In some embodiments, determining an execution priority of file access requests from a plurality of slave BMCs includes: receiving real-time load information of the plurality of slave BMCs; determining, based on real-time load information of the plurality of slave BMCs, a load order of the plurality of slave BMCs and determining, based on the load order, an execution priority of file access requests from the plurality of slave BMCs.

In determining the execution priority of the file access requests from the plurality of slave BMCs, the determination may be based on the real-time load information of the plurality of subordinate BCMs.

The master BMC receives real-time load information from a plurality of slave BMCs and sorts the loads of the plurality of slave BMCs based on the magnitude of the loads in the real-time load information. For example, prioritizing the file access requests of BMCs with smaller loads by deferring the priority of BMCs with larger loads based on load size may enhance the request processing speed.

The file-sharing method provided in the embodiments of the present application receives real-time load information of a plurality of slave BMCs through a master BMC, and the master BMC sorts the loads of the plurality of slave BMCs based on the magnitude of the loads in the real-time load information of the plurality of slave BMCs, thereby enhancing the file access request efficiency of the plurality of slave BMCs.

In some embodiments, the system further includes: receiving a file modification request; determining, based on the file system mapping table in the master BMC, the file to be modified corresponding to the file modification request, and the slave BMC storing the file to be modified among the plurality of slave BMCs; sending the file modification request to the slave BMC storing the file to be modified, thereby enabling the slave BMC storing the file to be modified to modify the file to be modified.

For file resources stored in the storage space of a plurality of slave BMCs, there may be instances where modifications, updates, or deletions are necessary. In this scenario, modifications to the files within the slave BMC may be implemented based on the master BMC.

In some embodiments, the master BMC receives a file modification request when a modification to a file in the slave BMC is required. The file modification request may be sent by a slave BMC within the server system or may be sent by a server node within the server system to the master BMC.

After receiving a file modification request, the master BMC queries a file system mapping table within the master BMC to determine the file to be modified associated with the modification request and a slave BMC among a plurality of slave BMCs that stores the file to be modified.

The master BMC sends a file modification request to the slave BMC storing the file to be modified. After receiving the file modification request, the slave BMC storing the file to be modified alters the file to be modified in its storage space.

In the file-sharing method provided in the embodiments of the present application, a master BMC transmits a file modification request to a slave BMC storing a file to be modified; after receiving the file modification request, the slave BMC storing the file to be modified modifies the file to be modified in its storage space, thereby implementing a process of modifying a stored file in the BMCs of various server nodes.

FIG. 4 is a second flow diagram of the file-sharing method provided in some embodiments of the present application. Referring to FIG. 4, the file-sharing method provided in the embodiments of the present application is applied to the slave BMC. T master BMC, and the plurality of slave BMCs are BMCs of different server nodes in a server system. The method includes the following steps:

Step 410, sending the file access request to the master BMC, such that after receiving the file access request, the master BMC determines, based on a file system mapping table in the master BMC, a file to be acquired corresponding to the file access request and a target slave BMC storing the file to be acquired among the slave BMCs, determines, based on a connection relationship table in the master BMC, a file transmission path for obtaining the file to be acquired from the target slave BMC, and acquires, based on the file transmission path, the file to be acquired from the target slave BMC and transmits the file to be acquired to the slave BMC that sends the file access request, the file system mapping table includes file storage addresses of the plurality of slave BMCs and file information stored in the file storage addresses, the connection relationship table is determined based on the connection relationships of various server nodes in the server system;

Step 420, receiving the file to be acquired that is sent by the master BMC.

The server system in the embodiments of the present application is constituted by a plurality of server nodes. Each server node includes a BMC. The BMC is a hardware component integrated into the server motherboard, which is utilized for monitoring, managing, and controlling the system hardware and associated functions. The BMC generally includes a dedicated microprocessor, a memory, and interface circuits, which are independent of the main processor. The BMC facilitates remote management, hardware monitoring, hardware upgrading, remote control, logging, and BIOS management of server hardware via remote management tools, thereby simplifying and optimizing the system management and maintenance processes.

The BMCs corresponding to a plurality of server nodes in a server system are classified into a master BMC and a plurality of slave BMCs. The master BMC is configured to coordinate and manage the file access operations of all slave BMCs. A controller may be configured within the master BMC, where the controller dynamically allocates and schedules file resources based on the system state and requirements, thereby ensuring efficient and stable access. In the selection of the master BMC, the BMC corresponding to the server node with a high functional core degree in the server system may be considered.

The slave BMC, in contrast to the master BMC, is a BMC that is managed and scheduled by the master BMC. The subordinate node executes the file scheduling tasks assigned by the master BMC.

In the following, the technical solution of the present application will be described in detail by taking the file-sharing method provided by the present application as an example, which is executed by a slave BMC.

In step 410, the slave BMC sends a file access request to the master BMC.

A file access request is a request sent by a slave BMC to acquire a file. When a slave BMC needs to acquire a file, a file access request is sent to the master BMC. After receiving the file access request sent by the slave BMC, the master BMC executes the corresponding request response.

In server systems, BMC is typically used to monitor and manage server hardware, such as CPU, memory, hard disk, etc. The BMC is also responsible for monitoring the power status of the server and controlling the remote power on/off functions of the server. With the expansion of server scale, the functionality of the BMC becomes increasingly diversified. The BMC not only monitors the hardware status but also provides additional services, such as remote control, hardware upgrade, and virtualization. Among these services, file access constitutes one of the most fundamental services.

The BMC in the server system of the related method is typically a separate chip, and the communication among them is generally realized via a serial communication protocol bus or a full-duplex, synchronous serial communication interface bus. This communication method has certain limitations, such as slow communication speed and limited transmission distance. In some large-scale data centers, to enhance the reliability and flexibility of the system, it is necessary to employ a plurality of BMCs, thereby necessitating file system sharing among the BMCs.

Due to the communication constraints based on the I2C bus or SPI bus in the related art, in order to enhance the communication speed and transmission distance, a communication link among a plurality of BMCs may be established prior to the interaction between a master BMC and a plurality of slave BMCs. A TCP/IP protocol stack may be implemented on the BMCs, and a communication connection among the BMCs may be established through a network protocol, thereby enabling message and data transmission between the master BMC and a plurality of slave BMCs.

After receiving a file access request sent by a slave BMC, the master BMC determines the file to be acquired corresponding to the file access request and the target slave BMC storing the file to be acquired among a plurality of slave BMCs, based on querying a file system mapping table configured within the master BMC.

The file system mapping table is pre-built, and the file system mapping table includes file storage addresses of a plurality of slave BMCs and file information stored in the file storage addresses. After receiving a file access request, the master BMC performs a query in a file system mapping table to determine the file to be acquired as specified in the file access request and the target slave BMC that contains the file to be acquired.

It is to be understood that a plurality of slave BMCs include storage space. Therefore, file resources may be stored in the storage space of a plurality of slave BMCs. The file system mapping table records the file resources stored in the storage spaces of a plurality of slave BMCs. File resources in a plurality of slave BMCs may be scheduled by a master BMC based on a file system mapping table, thereby enabling file exchange among the plurality of slave BMCs.

It is to be understood that various server nodes in the server system are interconnected, thereby establishing a connection relationship. Based on the connection relationship, a connection relationship table of various server nodes may be determined. The connection relationship may be a serial connection relationship among various server nodes, or a star connection relationship where a plurality of slave BMCs are respectively connected to a master BMC and the like.

After the master BMC determines the target slave BMC corresponding to the file to be acquired, there may be a plurality of communication paths between the master BMC and the target slave BMC, with a plurality of slave BMCs interspersed in between. Based on the connection relationship table, the optimal path between the master BMC and the target slave BMC may be determined. By acquiring the file to be acquired from the target slave BMC via the optimal path, the efficiency of file acquisition may be enhanced.

At the same time, based on the file transmission path, the acquisition path for acquiring the file to be acquired from the target slave BMC may be determined, thereby enabling the extraction of the file to be acquired.

In step 420, after the master BMC acquires the file to be acquired, the file to be acquired is transmitted to the slave BMC that issued the file access request, and the slave BMC receives the file to be acquired that is sent by the master BMC.

Based on a master BMC, file access requests from a plurality of slave BMCs are received. After obtaining the file to be acquired from the plurality of slave BMCs, the file is sent to the slave BMC that requires access to the file to be acquired. This enables file sharing among the plurality of BMCs within the server system, facilitating file transmission among the BMCs of various server nodes, thereby enhancing the file transmission efficiency of various server nodes in the server system.

The file-sharing method provided in the embodiments of the present application configures, within a master BMC, a file system mapping table that includes file storage addresses of a plurality of slave BMCs and file information stored in the file storage addresses, thereby enabling the master BMC to query the file system mapping table and acquire the file to be acquired corresponding to the file access request and its storage location after receiving the file access request. Based on a storage location, acquiring a file to be acquired and transmitting the file to be acquired to a corresponding slave BMC, thereby enabling mutual file transmission within the BMCs of various server nodes, facilitating file sharing among the BMCs of the server nodes, and enhancing the file transmission efficiency of various server nodes in a server system.

In some embodiments, the system further includes: sending a file modification request to the master BMC, such that the master BMC determines, based on a file system mapping table in the master BMC, a file to be modified corresponding to the file modification request, and the slave BMC storing the file to be modified among the plurality of slave BMCs, and sends the file modification request to the slave BMC storing the file to be modified, thereby enabling the slave BMC storing the file to be modified to modify the file to be modified.

For file resources stored in the storage space of a plurality of slave BMCs, there may be instances where modifications, updates, or deletions are necessary. In this scenario, modifications to the files within the slave BMC may be implemented based on the master BMC.

In some embodiments, when a modification to a file in a slave BMC is required, the slave BMC sends a file modification request to the master BMC.

After receiving a file modification request, the master BMC queries a file system mapping table within the master BMC to determine the file to be modified associated with the modification request and the specific slave BMC among a plurality of slave BMCs that stores the file to be modified.

The master BMC sends a file modification request to the slave BMC storing the file to be modified. After receiving the file modification request, the slave BMC storing the file to be modified alters the file to be modified in its storage space.

The file-sharing method provided in the embodiments of the present application realizes a modification process for a stored file in the BMCs of various server nodes by transmitting a file modification request to a master BMC, and after receiving the file modification request, a slave BMC storing the file to be modified alters the file to be modified within its storage space.

In some embodiments, the system further includes: receiving a file extraction message from a master BMC, and acquiring, based on the file extraction message, a file to be acquired corresponding to the file extraction message from a storage space; sending the file to be acquired to the master BMC.

When obtaining a file to be acquired from a target slave BMC, a file extraction message for the file to be acquired is generated and sent to the slave BMC. The file extraction message includes file information of the file to be acquired.

After receiving a file extraction message, the slave BMC acquires the file to be acquired from the storage space and sends the acquired file to be acquired to the master BMC.

The file-sharing method provided in the embodiments of the present application realizes the acquisition of a file to be acquired by generating a file extraction message for the file to be acquired and transmitting the file extraction message to a target slave BMC.

In some embodiments, receiving a file to be acquired sent by a master BMC includes: receiving a compressed file sent by the master BMC, where the compressed file is generated, by the master BMC, encrypting the file to be acquired to obtain an encrypted file to be acquired, and compressing the encrypted file to be acquired; decompressing the compressed file to obtain the encrypted file to be acquired; decrypting the encrypted file to be acquired to obtain the file to be acquired.

After the master BMC receives the file to be acquired, the file to be acquired is encrypted and compressed to obtain a compressed file and the compressed file is transmitted to the slave BMC that sends the file access request.

After receiving the compressed file, the slave BMC that sends the file access request performs decompression and decryption to obtain the file to be acquired.

Based on compressed transmission, the transmission speed of the file to be acquired may be enhanced, thereby improving the transmission efficiency.

In some embodiments, the encryption process may be performed by selecting a symmetric encryption algorithm such as AES or DES, or an asymmetric encryption algorithm such as RSA or ESS, based on the data encryption algorithm, thereby enhancing the security and efficiency of file transmission.

The embodiments of the present application provide a file-sharing method, which enhances the security and efficiency of file transmission by encrypting and compressing a file to be transmitted during the transmission of a file to be acquired.

Figure 5:
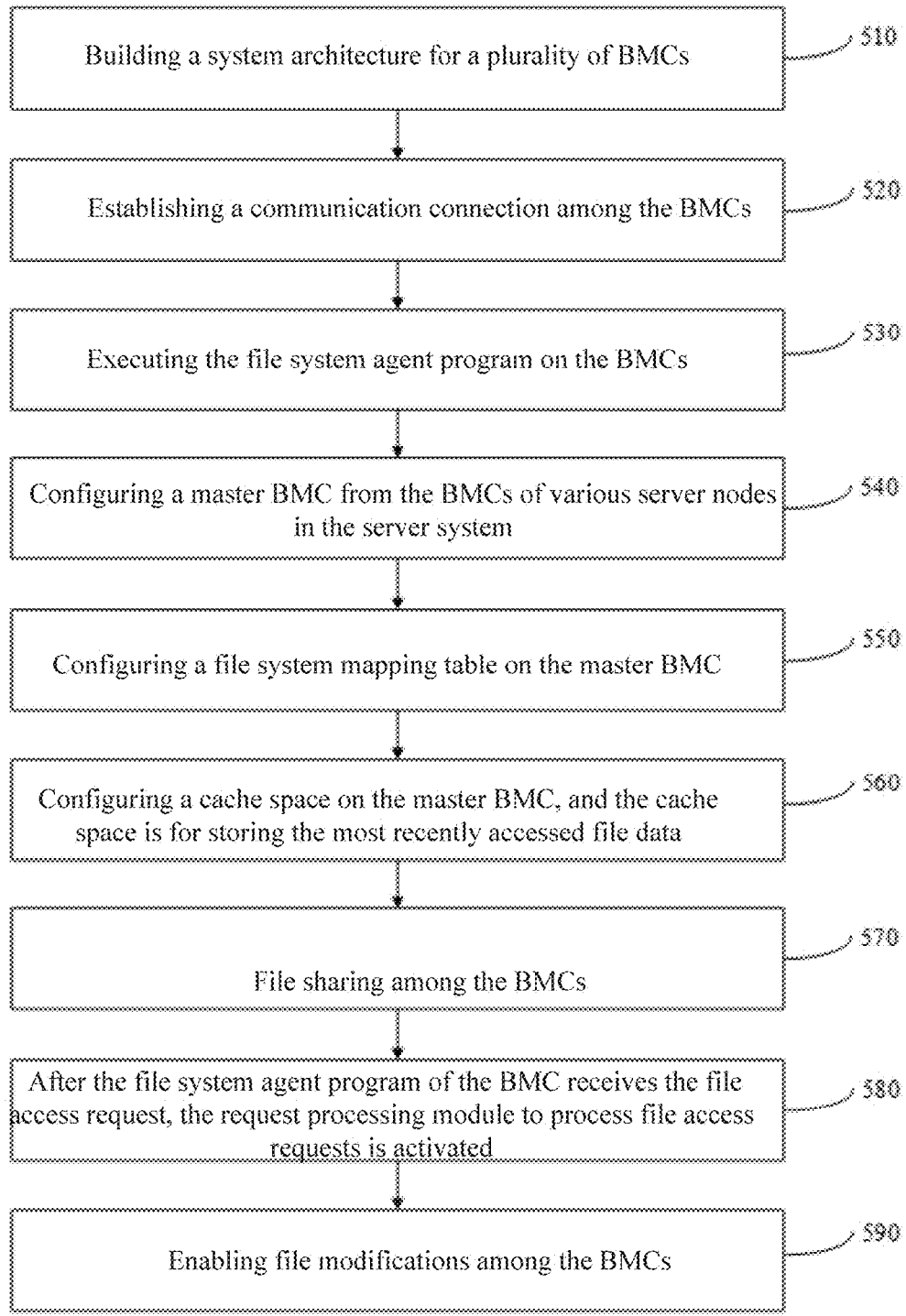
FIG. 5 is a flow diagram of applying the file-sharing method provided in some embodiments of the present application.
Figure 6:
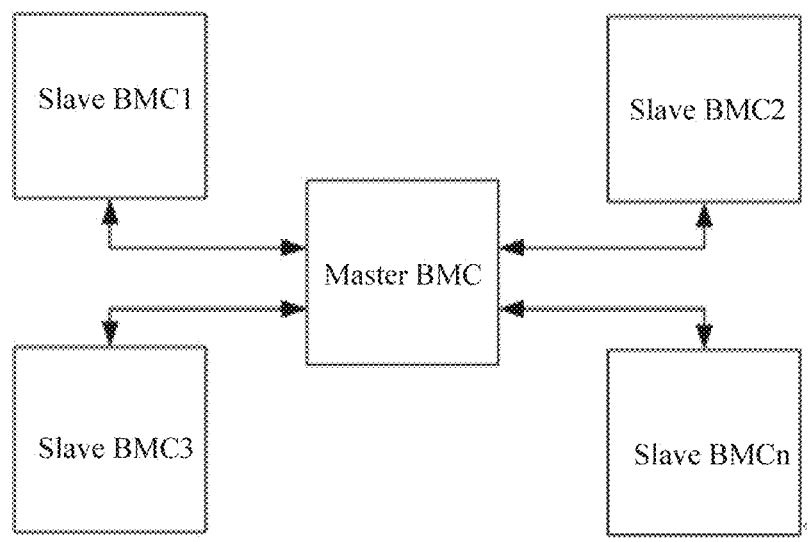
FIG. 6 is a schematic diagram of a system architecture provided the present application.

The technical solution provided by some embodiments of the present application is described below with reference to FIG. 5, which is a flow diagram illustrating the file-sharing method according to some embodiments of the present application:

Step 510, building a system architecture for a plurality of BMCs. The architecture schematic diagram may be illustrated as shown in FIG. 6, which is a schematic diagram of the system architecture provided by the present application. The architecture includes a plurality of slave BMCs (slave BMC1, slave BMC2, slave BMC3, slave BMCn) and a master BMC.

Step 520, establishing a communication connection among the plurality of BMCs. A TCP/IP protocol stack is installed on each BMCs, and communication connections among a plurality of BMCs are established via a network protocol.

Figure 7:
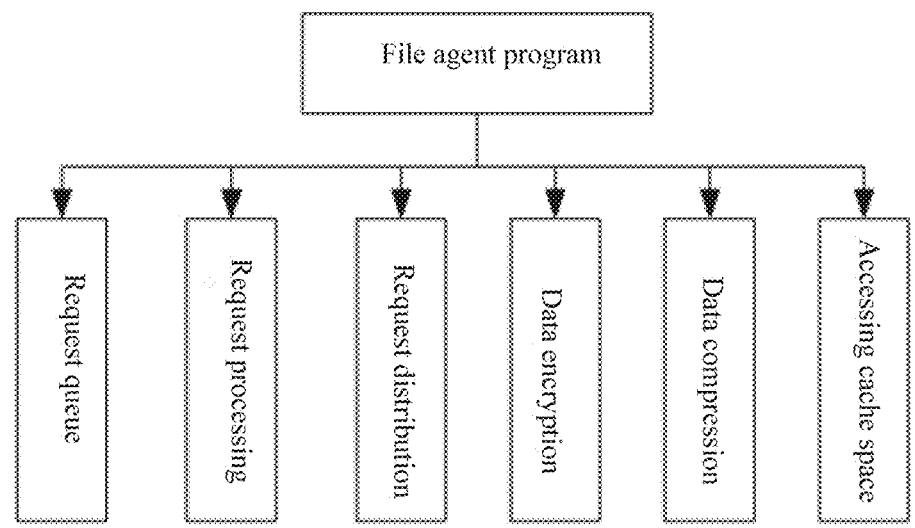
FIG. 7 is a schematic diagram of a core functionality of a file agent program provided in the present application.

Step 530, executing the file system agent program on a plurality of BMCs. Used to process file access requests and responses for files. The file system agent program incorporates data encryption and compression functionalities. The data encryption algorithm may be selected from symmetric encryption algorithms such as AES and DES, or asymmetric encryption algorithms such as RSA and ESS, to enhance the security and efficiency of the system. Multi-threading or multi-processing is employed to optimize the access and management of the file system, thereby improving the concurrency and responsiveness of the system. The functions of the file agent program may be illustrated in the schematic diagram of the core functions of the file agent program provided in FIG. 7 of the present application. The file agent program includes functions such as request queue, request processing, request distribution, data encryption, data compression, and access to cache space.

Step 540, configuring a master BMC from the BMCs of various server nodes in the server system. The master BMC is configured to coordinate and manage file system access operations of all slave BMCs. The master BMC is capable of dynamically allocating and scheduling file system resources based on the system's status and requirements, thereby ensuring the efficiency and stability of access. The master BMC selects a BMC with a high degree of functional core.

Step 550, configuring a file system mapping table on the master BMC. The file system mapping table refers to a data structure within the file system utilized for recording the physical storage locations and associated attributes of files and directories. It is configured to store file system information and file paths on the BMCs, serving as an intermediary station for file interaction.

Step 560, configuring a cache space on the master BMC, and the cache space is for storing the most recently accessed file data. The cache space is primarily designed for other BMCs to access the same file of the same BMC, thereby reducing redundant file request operations and enhancing the speed of file access.

Step 570, file sharing among the BMCs. When a BMC needs to access a file on another BMC, it first sends a file access request to the master BMC and adds the file access request to a request queue (the BMCs in the system may submit a file system access request to the request queue, which stores the requests in sequential order to ensure the orderliness and fairness of the requests). The request queue is used to store file access requests from a plurality of BMCs. The request processing module of the master BMC reads the contents of the request queue and determines the BMC where the request file is located based on the file mapping table. The file access request is forwarded to the file system agent program of a specific BMC according to predefined rules based on the request distribution module in the master BMC (the request distribution module is responsible for acquiring requests from the request queue and distributing them to an appropriate BMC for processing based on a scheduling algorithm, and the request distribution module may make judgments and decisions based on factors such as the type of request, priority, and load conditions of the BMC); when the master BMC needs to access the files of other slave BMCs, a dedicated request processing module is employed to handle the requests.

Step 580, after the file system agent program of the BMC receives the file access request, a request processing module (the BMCs are equipped with a request processing module, tasked with receiving and processing the file system access requests assigned to it) to process the file access request is activated. The BMC executes corresponding file system operations, such as reading, writing, and deleting, based on the type of the request, and is also responsible for returning the processing result to the request initiator or other relevant BMCs. First, it is verified whether the access file exists. In response to determining that the access file exists, it is further checked whether the file has access protection enabled. In response to determining that the file does not have access protection enabled, the file data is read and sent to the requester. In response to determining that the file has access protection enabled, an error message is returned.

Step 590, enabling file modifications among the BMCs. When a BMC needs to create or delete a file, it first sends a notification to the master BMC, which promptly updates the access status of the file system. When a BMC needs to modify a file, it first sends a request to the master BMC, which then forwards the request to the corresponding file system agent program for processing; after receiving the request, the file system agent program forwards the file operation request to the master BMC for verification, and executes the file operation after successful verification.

The sharing and accessing of files among a plurality of BMCs is realized, which is configured to various embedded systems. Have the advantage that High efficiency: the communication method based on network protocol is employed, eliminating the need for additional hardware devices and drivers, and offering high communication speed and transmission distance. A plurality of BMCs may simultaneously perform file system read and write operations, thereby enhancing system performance.

Reliability: by establishing a communication connection, the file system may be shared among the BMCs, and the master BMC may coordinate the file system read and write requests of a plurality of slave BMCs, thereby avoiding conflicts and delays and enhancing the reliability of the system.

Flexibility: by establishing the file system mapping relationship on the master BMC, the file systems on all BMCs may be conveniently managed and maintained, thereby enhancing the system's flexibility.

Figure 8:
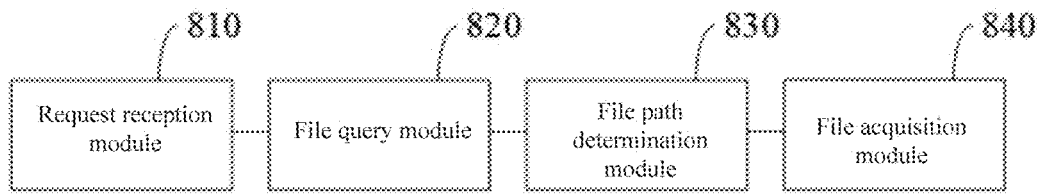
FIG. 8 is a first schematic diagram of a structure of a file-sharing apparatus provided in some embodiments of the present application.

FIG. 8 is a first schematic diagram of the structure of the file-sharing apparatus provided in some embodiments of the present application. Referring to FIG. 8, the file-sharing apparatus provided by some embodiments of the present application includes: a request reception module 810, a file query module 820, a file path determination module 830, and a file acquisition module 840.

The request reception module 810 is configured to receive file access requests from a plurality of slave BMCs; the file query module 820 is configured to determine a file to be acquired corresponding to the file access requests and a target slave BMC storing the file to be acquired among a plurality of slave BMCs based on a file system mapping table in a master BMC, where the file system mapping table includes file storage addresses of the plurality of slave BMCs and file information stored in the file storage addresses; the file path determination module 830 is configured to determine a file transmission path for obtaining a file to be acquired from a target slave BMC based on a connection relationship table in a master BMC, where the connection relationship table is determined based on the connection relationships of various server nodes in a server system;

The file acquisition module 840 is configured to acquire a file to be acquired from a target slave BMC based on a file transmission path and transmit the file to be acquired to a slave BMC that sends a file access request.

The file-sharing apparatus provided in the embodiments of the present application configures, within a master BMC, a file system mapping table that includes file storage addresses of a plurality of slave BMCs and file information stored in the file storage addresses, thereby enabling the master BMC to query the file system mapping table and acquire the file to be acquired corresponding to the file access request and its storage location after receiving the file access request. Based on a storage location, acquiring a file to be acquired and transmitting the file to be acquired to a corresponding slave BMC, thereby enabling mutual file transmission within the BMCs of various server nodes, facilitating file sharing among the BMCs of the server nodes, and enhancing the file transmission efficiency of various server nodes in a server system.

In some embodiments, the file acquisition module 840 is configured to generate a file extraction message for a file to be acquired based on file information of the file to be acquired and a file transmission path; sending the file extraction message to the target slave BMC, such that the target slave BMC transmits the file to be acquired to the master BMC based on the file transmission path.

In some embodiments, the file acquisition module 840 is further configured to encrypt a file to be acquired to obtain an encrypted file to be acquired, and compress the encrypted file to be acquired to obtain a compressed file; transmitting the compressed file to the slave BMC that sends the file access request.

In some embodiments, the file acquisition module 840 is further configured to store the file to be acquired in the cache space of the master BMC.

In some embodiments, the file acquisition module 840 is further configured to, in response to determining that the received file access requests from the plurality of slave BMCs are for acquiring the file to be acquired, acquire the file to be acquired from the cache space and transmit the file to be acquired to the slave BMC that sent the file access request.

In some embodiments, the file acquisition module 840 is further configured to: determine a required file to be acquired by the master BMC; and determine, based on the file system mapping table, a corresponding slave BMC among the plurality of slave BMCs that stores the required file; acquiring the required file from the corresponding slave BMC that stores the required file.

In some embodiments, the request reception module 810 is configured to determine the execution priority of file access requests from a plurality of slave BMCs; adding, based on the execution priority, the file access requests from the plurality of slave BMCs to a request queue, such that the master BMC executes a file acquisition operation based on the request queue.

In some embodiments, the request reception module 810 is further configured to receive real-time load information of a plurality of slave BMCs; determining, based on real-time load information of the plurality of slave BMCs, a load order of the plurality of slave BMCs and determining, based on the load order, an execution priority of file access requests from the plurality of slave BMCs.

In some embodiments, the file acquisition module 840 is further configured to: receive a file modification request; and determine, based on the file system mapping table in the master BMC, the file to be modified corresponding to the file modification request and the slave BMC storing the file to be modified among the plurality of slave BMCs; sending the file modification request to the slave BMC storing the file to be modified, thereby enabling the slave BMC storing the file to be modified to modify the file to be modified.

Figure 9:
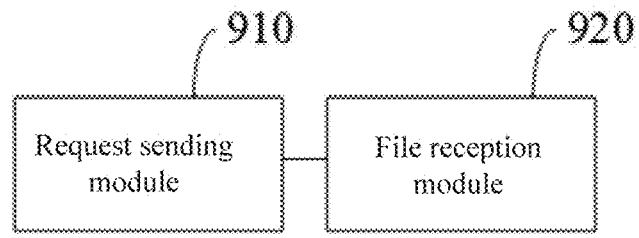
FIG. 9 is a second schematic diagram of the structure of the file-sharing apparatus provided in some embodiments of the present application.

FIG. 9 is a second schematic diagram of the structure of the file-sharing apparatus provided in some embodiments of the present application. Referring to FIG. 9, the file-sharing apparatus provided by some embodiments of the present application includes: the request sending module 910 and the file reception module 920.

The request sending module 910 is configured to send a file access request to a master BMC, such that after receiving the file access request, the master BMC determines a file to be acquired corresponding to the file access request and a target slave BMC storing the file to be acquired among a plurality of slave BMCs based on a file system mapping table within the master BMC. The master BMC further determines a file transmission path for acquiring the file to be acquired from the target slave BMC based on a connection relationship table within the master BMC and acquires the file to be acquired from the target slave BMC via the file transmission path. The file to be acquired is then transmitted to the slave BMC that initiated the file access request. The file system mapping table includes file storage addresses of the plurality of slave BMCs and file information stored at these addresses, and the connection relationship table is determined based on the connection relationships of various server nodes in a server system; the file reception module 920 is configured to receive the file to be acquired that is sent by the master BMC.

The file-sharing apparatus provided in the embodiments of the present application configures, within a master BMC, a file system mapping table that includes file storage addresses of a plurality of slave BMCs and file information stored in the file storage addresses, thereby enabling the master BMC to query the file system mapping table and acquire the file to be acquired corresponding to the file access request and its storage location after receiving the file access request. Based on a storage location, acquiring a file to be acquired and transmitting the file to be acquired to a corresponding slave BMC, thereby enabling mutual file transmission within the BMCs of various server nodes, facilitating file sharing among the BMCs of the server nodes, and enhancing the file transmission efficiency of various server nodes in a server system.

In some embodiments, the file reception module 920 is configured to: send a file modification request to the master BMC, enabling the master BMC to determine the file to be modified corresponding to the file modification request and the slave BMC storing the file to be modified among the plurality of slave BMCs, based on a file system mapping table in the master BMC, and sending the file modification request to the slave BMC storing the file to be modified, thereby enabling the slave BMC storing the file to be modified to modify the file to be modified.

In some embodiments, the file reception module 920 is further configured to: receive a file extraction message from a master BMC, and acquire, based on the file extraction message, a file to be acquired corresponding to the file extraction message from a storage space; sending the file to be acquired to the master BMC.

In some embodiments, the file reception module 920 is further configured to: receive a compressed file sent by the master BMC, where the compressed file is generated, by the master BMC, through encrypting the file to be acquired to obtain an encrypted file to be acquired, and subsequently compressing the encrypted file to be acquired;

decompressing the compressed file to obtain the encrypted file to be acquired; decrypting the encrypted file to be acquired to obtain the file to be acquired.

The present application further provides a file-sharing system, which includes a master BMC and a plurality of slave BMCs, where the master BMC and the plurality of slave BMCs are BMCs of different server nodes in a server system; the master BMC receives file access requests from the plurality of slave BMCs; the master BMC determines, based on a file system mapping table in the master BMC, a file to be acquired corresponding to the file access request and a target slave BMC storing the file to be acquired among the plurality of slave BMCs, where the file system mapping table includes file storage addresses of the plurality of slave BMCs and file information stored in the file storage addresses; the master BMC determining, based on a connection relationship table in the master BMC, a file transmission path for acquiring a file to be acquired from a target slave BMC, and the connection relationship table is determined based on a connection relationship of various server nodes in the server system; the master BMC acquires, based on the file transmission path, the file to be acquired from the target slave BMC and transmitting the file to be acquired to a slave BMC that sends a file access request; the slave BMC sending the file access request receives the file to be acquired that is sent by the master BMC.

The file-sharing system allows the master BMC to query the file system mapping table and acquire the file to be acquired corresponding to the file access request along with its storage location after receiving the file access request. This is realized by configuring the master BMC with a file system mapping table that includes file storage addresses of a plurality of slave BMCs and the file information stored at these addresses. Based on a storage location, acquiring a file to be acquired and transmitting the file to be acquired to a corresponding slave BMC, thereby enabling mutual file transmission within the BMCs of various server nodes, facilitating file sharing among the BMCs of the server nodes, and enhancing the file transmission efficiency of various server nodes in a server system.

Figure 10:
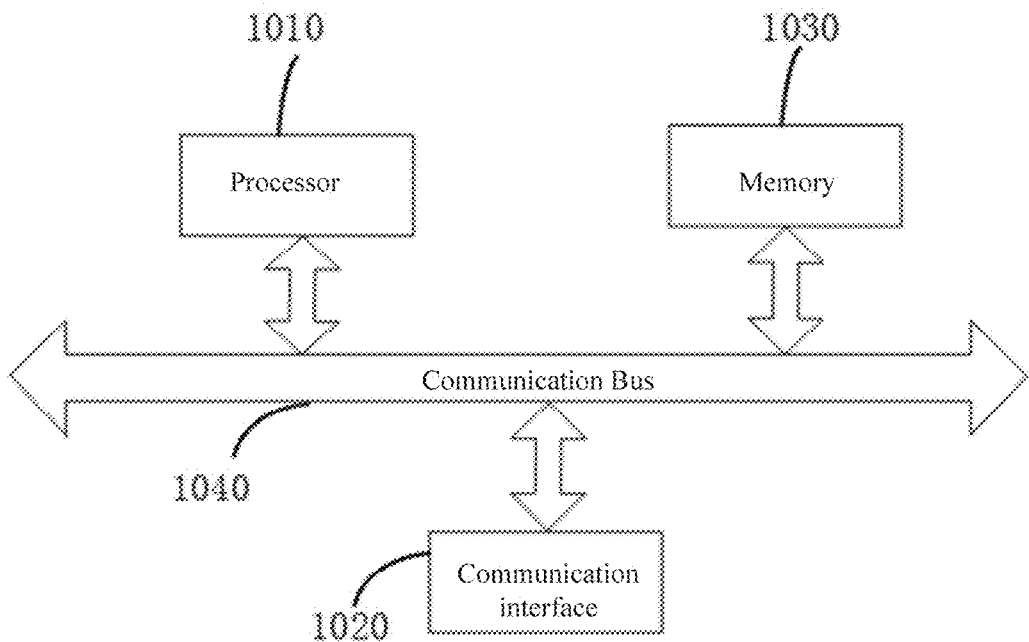
FIG. 10 is a schematic diagram of a structure of the electronic device provided in some embodiments of the present application.

The present application further provides an electronic device, as illustrated in FIG. 10, which may include: one or more processors 1010, communication interfaces 1020, a memory 1030, and a communication bus 1040, where the processors 1010, the communication interfaces 1020, and the memory 1030 communicate with each other via the communication bus 1040. The processor 1010 may call computer-readable instructions stored in the memory 1030 to execute a file-sharing method, which includes, for example:

receiving file access requests from the plurality of slave BMCs; determining, based on a file system mapping table in the master BMC, a file to be acquired corresponding to the file access request and a target slave BMC storing the file to be acquired among the plurality of slave BMCs, where the file system mapping table includes file storage addresses of the plurality of slave BMCs and file information stored in the file storage addresses; determining, based on a connection relationship table in the master BMC, a file transmission path for obtaining the file to be acquired from the target slave BMC, where the connection relationship table is determined based on the connection relationships of various server nodes in the server system; acquiring, based on the file transmission path, the file to be acquired from the target slave BMC and transmitting the file to be acquired to the slave BMC that sends the file access request.

In addition, the computer-readable instructions in the aforementioned memory 1030 may be implemented in the form of software functional units and stored in a computer-readable storage medium when sold or used as a standalone product. Based on such an understanding, the technical solution of the present application, or the portions thereof that substantially contribute to the related art, may be embodied in the form of a software product stored in a storage medium. The software product includes a plurality of instructions configured to cause a computer device (such as a personal computer, a server, or a network device) to execute all or part of the steps of the methods described in the various embodiments of the present application. The aforementioned storage medium includes: a USB flash drive, portable hard drive, read-only memory (ROM), random access memory (RAM), magnetic disk, optical disk, and other media capable of storing program codes.

On the other hand, the present application further provides a computer program product. The computer program product includes computer-readable instructions stored on a non-transitory computer-readable storage medium. When the computer-readable instructions are executed by a computer, the computer is configured to perform the file-sharing method provided by the aforementioned method embodiments, including, for example:

receiving file access requests from the plurality of slave BMCs; determining, based on a file system mapping table in the master BMC, a file to be acquired corresponding to the file access request and a target slave BMC storing the file to be acquired among the plurality of slave BMCs, where the file system mapping table includes file storage addresses of the plurality of slave BMCs and file information stored in the file storage addresses; determining, based on a connection relationship table in the master BMC, a file transmission path for obtaining the file to be acquired from the target slave BMC, where the connection relationship table is determined based on the connection relationships of various server nodes in the server system; acquiring, based on the file transmission path, the file to be acquired from the target slave BMC and transmitting the file to be acquired to the slave BMC that sends the file access request.

In yet another aspect, the present application further provides a non-transitory computer-readable storage medium having stored thereon computer-readable instructions that, when executed by a processor, implement the file-sharing method provided by the aforementioned method embodiments, including, for example:

receiving file access requests from the plurality of slave BMCs; determining, based on a file system mapping table in the master BMC, a file to be acquired corresponding to the file access request and a target slave BMC storing the file to be acquired among the plurality of slave BMCs, where the file system mapping table includes file storage addresses of the plurality of slave BMCs and file information stored in the file storage addresses; determining, based on a connection relationship table in the master BMC, a file transmission path for obtaining the file to be acquired from the target slave BMC, where the connection relationship table is determined based on the connection relationships of various server nodes in the server system; acquiring, based on the file transmission path, the file to be acquired from the target slave BMC and transmitting the file to be acquired to the slave BMC that sends the file access request.

The embodiments of the apparatus described above are illustrative, where the units described as separate components may or may not be physically separated, and the components displayed as units may or may not be physical units, that is, they may be located in one place or distributed across a plurality of network units. Some or all of the modules may be selected based on practical requirements to realize the objectives of the solution in this embodiment. A person skilled in the art may understand and implement the invention without the exercise of inventive faculty.

From the above description of the embodiments, those skilled in the art may clearly understand that the embodiments may be implemented by means of software combined with a necessary general-purpose hardware platform, or alternatively, by hardware alone. Based on such understanding, the above technical solution, or the part that contributes to the related art, may be embodied in the form of a software product. This computer software product may be stored in a computer-readable storage medium, such as ROM/RAM, a magnetic disk, an optical disk, etc., and includes a number of instructions for causing a computer device (which may be a personal computer, a server, or a network device, etc.) to execute the methods of various embodiments or certain parts of the embodiments.

It is to be finally noted that: the above embodiments are merely illustrative of the technical solutions of the present application and are not intended to limit the scope thereof. Although the present application has been described in detail with reference to the foregoing embodiments, those skilled in the art will understand that: the technical solutions described in the aforementioned embodiments may still be modified, or some of the technical features therein may be equivalently substituted. However, such modifications or replacements do not deviate from the spirit and scope of the technical solutions of the embodiments of the present application.

The invention claimed is:

1. A file-sharing method, being applied to a master baseboard management controller (BMC), wherein the master BMC and a plurality of slave BMCs are BMCs of different server nodes in a server system, and the method comprises:
   receiving file access requests from the plurality of slave BMCs;
   determining, based on a file system mapping table in the master BMC, a file to be acquired corresponding to the file access requests and a target slave BMC storing the file to be acquired among the plurality of slave BMCs, wherein the file system mapping table comprises file storage addresses of the plurality of slave BMCs and file information stored in the file storage addresses;
   determining, based on a connection relationship table in the master BMC, a file transmission path for obtaining the file to be acquired from the target slave BMC, wherein the connection relationship table is determined based on connection relationships of various server nodes in the server system; and
   acquiring, based on the file transmission path, the file to be acquired from the target slave BMC and transmitting the file to be acquired to a slave BMC that sends a file access request.

2. The file-sharing method according to claim 1, wherein the acquiring, based on the file transmission path, the file to be acquired from the target slave BMC comprises:
   generating, based on file information of the file to be acquired and the file transmission path, a file extraction message for the file to be acquired; and
   sending the file extraction message to the target slave BMC, such that the target slave BMC transmits the file to be acquired to the master BMC based on the file transmission path.

3. The file-sharing method according to claim 1, wherein the transmitting the file to be acquired to a slave BMC that sends a file access request comprises:
   encrypting the file to be acquired to obtain an encrypted file to be acquired, compressing the encrypted file to be acquired to obtain a compressed file; and
   transmitting the compressed file to the slave BMC that sends the file access request.

4. The file-sharing method according to claim 1, wherein after the acquiring the file to be acquired from the target slave BMC, the method further comprises:
   storing the file to be acquired into a cache space of the master BMC.

5. The file-sharing method according to claim 4, wherein after the storing the file to be acquired into a cache space of the master BMC, the method further comprises:
   in response to determining that the file access requests from the plurality of slave BMCs are for acquiring the file to be acquired, acquiring the file to be acquired from the cache space, and transmitting the file to be acquired to the slave BMC that sends the file access request.

6. The file-sharing method according to claim 1, further comprising:
   determining a required file to be acquired by the master BMC;
   determining, based on the file system mapping table, a corresponding slave BMC among the plurality of slave BMCs that stores the required file; and
   acquiring the required file from the corresponding slave BMC that stores the required file.

7. The file-sharing method according to claim 1, wherein after the receiving file access requests from the plurality of slave BMCs, the method further comprises:
   determining an execution priority of the file access requests from the plurality of slave BMCs; and
   adding, based on the execution priority, the file access requests from the plurality of slave BMCs to a request queue, such that the master BMC executes a file acquisition operation based on the request queue.

8. The file-sharing method according to claim 7, wherein the determining an execution priority of the file access requests from the plurality of slave BMCs comprises:
   receiving real-time load information of the plurality of slave BMCs; and
   determining, based on the real-time load information of the plurality of slave BMCs, a load order of the plurality of slave BMCs and determining, based on the load order, the execution priority of the file access requests from the plurality of slave BMCs.

9. The file-sharing method according to claim 1, further comprising:
   receiving a file modification request;
   determining, based on the file system mapping table in the master BMC, a file to be modified corresponding to the file modification request and a slave BMC storing the file to be modified among the plurality of slave BMCs; and sending the file modification request to the slave BMC storing the file to be modified, thereby enabling the slave BMC storing the file to be modified to modify the file to be modified.

10. The file-sharing method according to claim 1, wherein a connection relationship between the master BMC and the plurality of slave BMCs is a star connection relationship.

11. The file-sharing method according to claim 1, wherein after the receiving file access requests from the plurality of slave BMCs, and before the determining, based on a file system mapping table in the master BMC, a file to be acquired corresponding to the file access requests and a target slave BMC storing the file to be acquired among the plurality of slave BMCs, the method further comprises:
    determining whether the file access requests are for accessing a file in a storage space of the master BMC;
    in response to determining that the file access requests access the file in the storage space of the master BMC, calling a file processing module in the master BMC for processing; or
    in response to determining that the file access requests access a file in one of the plurality of slave BMCs, adding the file access requests to a request queue, and proceeding to the determining, based on a file system mapping table in the master BMC, a file to be acquired corresponding to the file access requests and a target slave BMC storing the file to be acquired among the plurality of slave BMCs.

12. A file-sharing method, being applied to a slave baseboard management controller (BMC), wherein a master BMC and a plurality of slave BMCs are BMCs of different server nodes in a server system, and the method comprises:
    sending a file access request to the master BMC, such that after receiving the file access request, the master BMC determines, based on a file system mapping table in the master BMC, a file to be acquired corresponding to the file access request and a target slave BMC storing the file to be acquired among the plurality of slave BMCs, determines, based on a connection relationship table in the master BMC, a file transmission path for obtaining the file to be acquired from the target slave BMC, and acquires, based on the file transmission path, the file to be acquired from the target slave BMC and transmits the file to be acquired to a slave BMC that sends the file access request, wherein the file system mapping table comprises file storage addresses of the plurality of slave BMCs and file information stored in the file storage addresses, and the connection relationship table is determined based on connection relationships of the different server nodes in the server system; and
    receiving the file to be acquired that is sent by the master BMC.

13. The file-sharing method according to claim 12, further comprising:
    sending a file modification request to the master BMC, such that the master BMC determines, based on the file system mapping table in the master BMC, a file to be modified corresponding to the file modification request and a slave BMC storing the file to be modified among the plurality of slave BMCs, and sends the file modification request to the slave BMC storing the file to be modified, thereby enabling the slave BMC storing the file to be modified to modify the file to be modified.

14. The file-sharing method according to claim 12, further comprising:
    receiving a file extraction message from the master BMC, and based on the file extraction message, acquiring the file to be acquired corresponding to the file extraction message from a storage space; and
    sending the file to be acquired to the master BMC.

15. The file-sharing method according to claim 12, wherein the receiving the file to be acquired that is sent by the master BMC comprises:
    receiving a compressed file sent by the master BMC, wherein the compressed file is generated by the master BMC encrypting the file to be acquired to obtain an encrypted file to be acquired, and compressing the encrypted file to be acquired;
    decompressing the compressed file to obtain the encrypted file to be acquired; and
    decrypting the encrypted file to be acquired to obtain the file to be acquired.

16. A file-sharing system, comprising a master baseboard management controller (BMC) and a plurality of slave BMCs, wherein the master BMC and the plurality of slave BMCs are BMCs of different server nodes in a server system;
    the master BMC receives file access requests from the plurality of slave BMCs;
    the master BMC determines, based on a file system mapping table in the master BMC, a file to be acquired corresponding to the file access requests and a target slave BMC storing the file to be acquired among the plurality of slave BMCs, wherein the file system mapping table comprises file storage addresses of the plurality of slave BMCs and file information stored in the file storage addresses;
    the master BMC determines, based on a connection relationship table in the master BMC, a file transmission path for obtaining the file to be acquired from the target slave BMC, wherein the connection relationship table is determined based on connection relationships of various server nodes in the server system;
    the master BMC acquires, based on the file transmission path, the file to be acquired from the target slave BMC and transmits the file to be acquired to a slave BMC that sends a file access request; and
    the slave BMC that sends the file access request receives the file to be acquired that is sent by the master BMC.

17. The file-sharing method according to claim 1, wherein before the receiving file access requests from the plurality of slave BMCs, comprising:
    implementing a transmission control protocol/internet protocol (TCP/IP) protocol on each of the master BMC and the plurality of slave BMCs, to establish a communication connection among the master BMC and the plurality of slave BMCs.

18. The file-sharing method according to claim 1, wherein the connection relationships of the various server nodes are serial connection relationships.

19. The file-sharing method according to claim 1, further comprising:
    determining an optimal path between the master BMC and the target slave BMC based on the connection relationship table; and
    acquiring the file to be acquired from the target slave BMC through the optimal path.

20. The file-sharing method according to claim 4, wherein after the storing the file to be acquired into a cache space of the master BMC, further comprising:
    acquiring the file to be acquired from the cache space of the master BMC in response to a firmware upgrade perform of other BMCs.

* * * * *